Sept. 27, 1932.   M. N. FAIRBANK   1,880,079
AEROPLANE WHEEL
Filed July 2, 1931
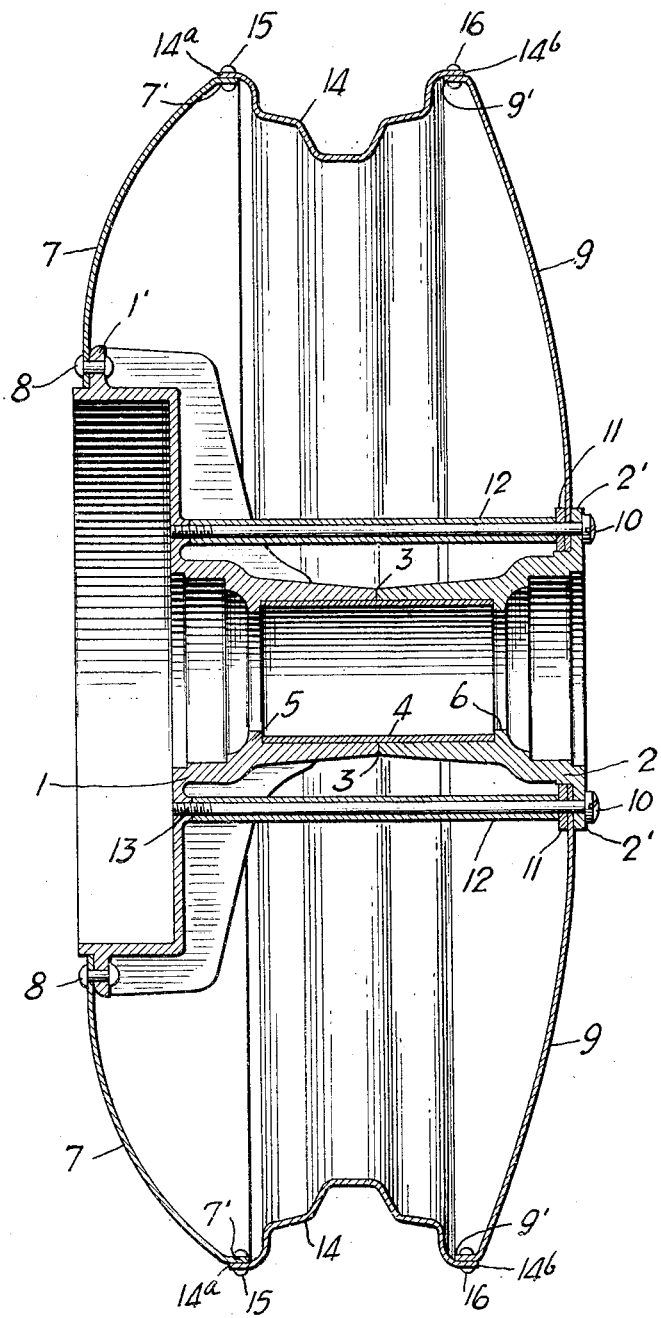
INVENTOR
M. N. FAIRBANK
BY his ATTORNEYS
Hoguet & Neary Patented Sept. 27, 1932

1,880,079

UNITED STATES PATENT OFFICE

MURRY N. FAIRBANK, OF COLD SPRING HARBOR, NEW YORK

AEROPLANE WHEEL

Application filed July 2, 1931. Serial No. 548,324.

This invention relates in general to metallic wheels and more particularly to those of the double disc type and to the manner and method of construction and assembly of the discs and hubs of such wheels.

An object of the invention is to so construct the wheel assembly including the discs, rim, and hub that they may be assembled with the maximum ease to comprise a durable wheel without the necessity of reinforcing expedients at the points of connection of the several parts.

Another object is to so construct the hub, rim and discs that interior as well as exterior access may be had to the wheel during the assembly of the discs and rim that the points of connection of the discs to the hub and to the rim may be riveted, spot welded, seam welded or otherwise effected interiorly and exteriorly.

It is common practice to provide a double disc wheel which is riveted or welded to the hub and rim, but heretofore such points of connection have been effected exteriorly of the wheel. This in itself has been found insufficient and in order to make such a wheel sufficiently strong, reinforcing elements such as beads have been exteriorly fastened to these points of connection to lessen the liability of fracture.

It is an object of this invention to eliminate the necessity of such reinforcement and of this extra step in assembly and to this end it is proposed to split the hub and to fasten the rim to the two discs and to one part of the hub and to subsequently join and secure the two parts of the hub together and to the second disc, and furthermore to bring about the fastening of the discs to the rim and hub by riveting, spot welding, seam welding or otherwise, and utilizing not only the exterior but also the interior access, provided for by the particular arrangement afforded by the split hub, to bring about the interior as well as exterior fastening to provide a strong, and durable joint which will eliminate the necessity for reinforcement.

With the foregoing and other objects in view, the invention consists in the combination of parts and in the details of construction hereinafter set forth in the following specification and appended claims, certain embodiments of the invention being illustrated in the accompanying drawing, which is a view in vertical section through the hub rim, and discs of the wheel.

Referring more particularly to the drawing, which shows the complete assembled wheel, the hub is split and comprises an inner and outer hub 1 and 2, the point of abutment thereof being indicated at 3, the two hubs 1 and 2 being aligned by means of an interior sleeve 4 extending between the shoulders 5 and 6 of hubs 1 and 2 respectively.

A disc 7 is shown riveted at 8 to a flange 1′ of the inner hub, while the other disc is secured to a flange 2′ of the outer hub by passing a plurality of tie bolts 10 through the flange and disc and through a washer 11 which forms an abutment for sleeves 12 through which the tie bolts pass, the other end of the tie bolts being screwed into the inner hub at 13. A circumferential rim 14 is shown riveted at 15 to the inner disc 7 and at 16 to the outer disc 9.

Before going into detail regarding the assembly of the wheel it should be understood that the wheel is especially adapted but in no wise limited for use as an aeroplane wheel. Emphasis is also laid on the fact that while the points of connection are shown as being effected by the use of rivets, other means such as spot welding or seam welding may be employed for effecting these connections. In any event, it will be noted that the discs 7 and 9 are merely flanged inwardly at 7′ and 9′ and that the outer extremities 14ª to 14ᵇ of the rim lay flat over these flanges and are secured thereto, there being no exterior flanges or seams to interrupt the general useful contour of the wheel.

In describing the sequence of assembly suffice it to say that the discs are fastened to the hub and to the rim without further reference to the actual fastening means employed. Starting with the inner hub alone, the remainder of the wheel assembly being unassembled, the inner disc 7 may be fastened to the hub flange 1′ at 8. The next step is to fasten a rim 14 to the outer disc 9 by joining the respective circular flanges 14^b and 9' at 16. The disc 9 and the rim 14 attached thereto may then be brought adjacent to the inner disc 7 so that the flat rim extremity 14^a lies over the disc flange 7' where the two are fastened together at 15. The outer hub has as yet not been assembled as the above described fastening operation contemplates free interior access to the wheel by means of the handhole defined by the space occupied by the outer hub when the wheel is fully assembled, the purpose of providing for this access having been hereinabove set forth. In order to insure registry of the circularly arranged series of apertures in the outer disc 9 and the inner hub several of the tie bolts may be temporarily passed through the apertures in the outer disc 9 and screwed into the inner hub at 13. When the connection of the rim 14 to the inner disc 7 has been completed the tie bolts may then be removed and the sleeve 4 fitted into the interior hub until it strikes the shoulder 5. Then the tie rods 10 are passed through the apertures and the flange 2' of the outer hub, through the apertures in the outer disc 9 and through the apertures in the circular washer 11. The tie bolts are also passed through their respective sleeves 12 as the outer hub is slipped over the sleeve 4. The tightening up of the tie bolts 10 completes the assembly.

Thus it will be seen that during the course of assembly access may be had to both sides of the disc 7 in securing it to the inner hub and also that similar access may be had to the outer disc 9 in case it is desired to employ other means of fastening this disc to the outer hub than that shown in the drawing.

Moreover, and more important, it will be seen that access may be had to the interior and exterior of the wheel during the fastening of the rim to the two discs to the elimination of any exterior flanges or reinforcement for the points of connection.

Having thus described my invention, I claim:

1. The method of assembling a metallic disc wheel which involves the use of a pair of centrally apertured metallic discs, a tire rim, and a hub formed of two longitudinal sections, which method consists of attaching one of said discs to said inner hub, attaching said tire rim to the other disc and making use of interior and exterior access in effecting such attachment, bringing said rim adjacent said inner disc, reaching through the aperture in said outer disc to obtain interior access to the casing, effecting an interior and exterior attachment of said rim to said inner disc, and subsequently passing said outer hub section through the aperture of said outer disc and connecting said outer hub section thereto and to said inner hub section.

2. The method of assembling a metallic disc wheel which involves the use of a pair of metallic discs, a tire rim, and a hub, which method consists in securing one of said discs to said hub, effecting fastening of said rim to said discs by exterior and interior access to the wheel casing, and the attachment of the other of said discs to said hub.

3. The method of assembling a metallic disc wheel involving the use of a pair of metallic discs, a tire rim, and a hub, which method consists in securing one of said discs to said hub, forming both of said discs with flat inwardly extending flanges at their peripheries, placing said rim in overlapped relation to said disc flanges, fastening them in such position and in so doing using interior as well as exterior access to the wheel casing so formed, connecting the other of said discs to said hub.

4. The method of assembling a metallic wheel involving the use of a pair of centrally apertured discs, a tire rim, and a hub having two separable units, which method consists in connecting one of said discs to the inner one of said hub sections, forming both of said discs with flat inwardly extending flanges at their peripheries, placing said rim in overlapped relation to one of said disc flanges, welding or otherwise fastening the two together on both sides, placing the rim in overlapped relation to said flange of the other disc, welding or otherwise fastening the two together on both sides and in so doing utilizing the interior access afforded by the central aperture of the other or outer disc, passing said outer hub section through the central aperture of said outer disc, aligning and fastening said hub section to the inner hub section and to said outer disc, and passing tie bolts through the assembly and securing it to the inner hub section.

In testimony whereof, I have signed my name to this specification this 29 day of June, 1931.

MURRY N. FAIRBANK.